(12) United States Patent
Kleppe et al.

(10) Patent No.: US 10,996,452 B2
(45) Date of Patent: May 4, 2021

(54) HIGH-RESOLUTION 2D MICROSCOPY WITH IMPROVED SECTION THICKNESS

(71) Applicant: Carl Zeiss Microscopy GmbH, Jena (DE)

(72) Inventors: Ingo Kleppe, Jena (DE); Yauheni Novikau, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/107,506

(22) Filed: Sep. 13, 2018

(65) Prior Publication Data

US 2019/0064495 A1 Feb. 28, 2019

(30) Foreign Application Priority Data

Aug. 25, 2017 (DE) .......................... 102017119531.9

(51) Int. Cl.
*G02B 21/00* (2006.01)
*G02B 27/58* (2006.01)
*G06T 3/40* (2006.01)

(52) U.S. Cl.
CPC ....... *G02B 21/0072* (2013.01); *G02B 21/008* (2013.01); *G02B 21/0032* (2013.01);
(Continued)

(58) Field of Classification Search
CPC ................................ G02B 27/00; G02B 21/00
See application file for complete search history.

(56) References Cited

U.S. PATENT DOCUMENTS 3,013,467 A 11/1957 Minsky
6,166,853 A 12/2000 Sapia et al.
(Continued)

FOREIGN PATENT DOCUMENTS

| DE | 102010049627 A1 | 5/2011 |
|---|---|---|
| DE | 102013218795 A1 | 3/2015 |
| EP | 2317362 A1 | 5/2011 |
| EP | 2860566 A2 | 4/2015 |

OTHER PUBLICATIONS

Conference Presentation—"Non-Linear Image Scanning Microscopy"; http://dx.doi.org/10.1117/12.2255891.5380386346001.
(Continued)

*Primary Examiner* — Clifford Hilaire
(74) *Attorney, Agent, or Firm* — Duane Morris LLP (57) ABSTRACT

A method and microscope for high-resolution 2D scanning microscopy of a sample, wherein the sample is illuminated with illumination radiation in such a way that the illumination radiation is focused in or on the sample to form a diffraction-limited illumination spot at a point. The point is imaged in a diffraction-limited manner into a diffraction image on a spatially resolving surface detector, wherein the surface detector has a spatial resolution that resolves a diffraction structure of the diffraction image. Neither an imaging point spread function nor an illumination point spread function is manipulated for producing an asymmetry. The point is displaced relative to the sample into different scanning positions. A 2D image of the sample is produced from the data of the surface detector and from the scanning positions assigned to said data. The 2D image has a resolution that is increased beyond a resolution limit for imaging.

16 Claims, 4 Drawing Sheets

(52) U.S. Cl.
CPC ..... *G02B 21/0036* (2013.01); *G02B 21/0076* (2013.01); *G02B 27/58* (2013.01); *G06T 3/4053* (2013.01)

(56) References Cited

U.S. PATENT DOCUMENTS

| | | | |
|---|---|---|---|
| 8,705,172 | B2 | 4/2014 | Kleppe et al. |
| 2003/0228053 | A1* | 12/2003 | Li .............................. G06T 7/55 382/154 |
| 2009/0219607 | A1* | 9/2009 | Saggau .............. G02B 21/0016 359/305 |
| 2011/0267688 | A1* | 11/2011 | Kleppe .............. G02B 21/0036 359/385 |
| 2015/0077842 | A1 | 3/2015 | Kleppe et al. |
| 2015/0077844 | A1 | 3/2015 | Singer et al. |

OTHER PUBLICATIONS

Sarder, Pinaki, et al.; "Deconvolution Methods for 3-D Fluorescence Microscopy Images", IEEE Signal Processing Magazine 2006; 23(3):32-45.

Mueller, Claus B., et al.; "Image Scanning Microscopy"; Physical Review Letters 2010; 104:198101-1-198101-4.

York, Andrew G., et al.; "Resolution doubling in live, multicellular organisms via multifocal structured illumination microscopy"; Nature Methods 2012; 9(7):749-754.

De Luca, Giulia M.R., et al.; "Re-scan confocal microscopy: scanning twice for better resolution"; Biomedical Optics Express 2013; 4(11):2644-2656.

Roth, Stephan, et al.; "Optical Photon Reassignment Microscopy (OPRA)"; arXiv: 1306.6230.

Gregor, Ingo, et al.; "Single Molecule Spectroscopy and Super-resolution Imaging X"; Proceedings of SPIE 10071 2017; 100710C; doi: 10.1117/12.2255891.

Jesacher, Alexander, et al.; "Three-dimensional information from two-dimensional scans: a scanning microscope with postacquisition refocusing capability"; Optica 2015; 2(3):210-213.

Huff, Joseph, et al.; "The Airyscan Detector from Zeiss—Confocal Imaging with Improved Signal-to-Noise Ratio and Superresolution"; Zeiss Technology Note, Jena, Jul. 2015; 1-18.

Huff, Joseph, et al.; "The New 2D Superresolution Mode for Zeiss Airyscan—120 nm Lateral Resolution without Acquiring a Z-stack"; Zeiss Technology Note, Jena, Nov. 2017; 1-5.

Huff, Joseph, et al.; "The new 2D Superresolution mode for Zeiss Airyscan"; Nature Methods 2017;14:iv-vi.

\* cited by examiner

HIGH-RESOLUTION 2D MICROSCOPY WITH IMPROVED SECTION THICKNESS

RELATED APPLICATIONS

The present application is a U.S. nonprovisional application which claims priority benefit of German Application No. DE 10 2017 119 531.9 filed on Aug. 25, 2017, the contents of which is hereby incorporated by reference in its entirety.

BACKGROUND

The invention relates to a method and microscope for high-resolution 2D scanning microscopy of a sample.

The sample is illuminated with illumination radiation in such a way that the illumination radiation is focused in or on the sample to form a diffraction-limited illumination spot at a point. The point is imaged in a diffraction-limited manner into a diffraction image on a spatially resolving surface detector. The surface detector has a spatial resolution that resolves a diffraction structure of the diffraction image, wherein neither an imaging point spread function nor an illumination point spread function is manipulated for producing an asymmetry. The point is displaced relative to the sample into different scanning positions with a scanning step increment of less than half the diameter of the illumination spot. Thus, a plurality of scanning positions are scanned while the z-location of a focal plane of the imaging is fixed. The surface detector is read, and a 2D image of the sample is produced from the data of the surface detector and from the scanning positions assigned to said data. This 2D image has a resolution that is increased beyond a resolution limit for imaging. The microscope has an illumination beam path for illuminating the sample with illumination radiation, wherein the illumination beam path is free from elements for manipulating an illumination point spread function. An imaging beam path for diffraction-limited imaging of the point into a diffraction image on a spatially resolving surface detector is free from elements for manipulating an imaging point spread function. The surface detector has a spatial resolution that resolves a diffraction structure of the diffraction image. A scanning device for displacing the point relative to the sample into different scanning positions with an increment of less than half the diameter of the illumination spot scans a plurality of scanning positions at a fixed z-location of a focal plane of the image. An evaluation device produces a 2D image of the sample from the data of the surface detector and from the scanning positions assigned to said data. The 2D image has a resolution that is increased beyond a resolution limit of the imaging beam path.

A classical field of application of light microscopy is laser scanning microscopy (in short also LSM), which uses a confocal detection arrangement to image only that plane of the sample that is situated in the focal plane of the objective. This obtains an optical section, the thickness of which depends on the size of the confocal stop. The recording of multiple optical sections at different depths of the sample permits to generate a three-dimensional image of the sample, which is then made up of the different optical sections. Laser scanning microscopy is therefore suitable for examining thick preparations.

In principle, the optical resolution of a light microscope, including that of an LSM, is diffraction-limited by physical laws. The term "high-resolution" is here used for resolutions beyond the diffraction limit. Overcoming the diffraction limit is achieved by what is known as Airyscan microscopy, which is described e.g. in EP 2317362 A1, which is hereby incorporated by reference. This document combines, in the embodiment illustrated and described in FIG. 5 therein, diffraction-limited illumination of the sample with a surface detector, wherein a scanning device is configured such that the diffraction image of the point that is illuminated with the illumination spot rests on the surface detector. This arrangement is referred to as a "de-scanned" detector arrangement. It is typically achieved by arranging a scanner that deflects the beam path between the combination point between illumination device and imaging device and the sample. Such a scanner acts both on the illumination spot and on the imaging of the point that is illuminated with the illumination spot, with the result that the beam path in the imaging direction after the scanner is static. An alternative to such a scanner is the use of a movable sample stage which displaces the sample. In that case, the diffraction image also rests on the surface detector. In the concept of EP 2317362 A1, the surface detector is provided with a spatial resolution that, with reference to the imaging scale, effects oversampling of the diffraction image and thus permits resolving the structure of the diffraction image.

In classical confocal microscopy, depth resolution is linked inseparably with the size of the confocal pinhole stop. This stop filters out extrafocal light and generates the optical section. Consequently, on the path to ever thinner optical sections, light losses increase, because the stop significantly blocks light. The use of a very small confocal stop indeed results in a very thin optical section, but with a very poor signal-to-noise ratio.

This problem equally arises in Airyscan microscopy, which replaces the pinhole stop used in the classical method (cf. U.S. Pat. No. 3,013,467 A) by a 2D sensor, or images the stop plane onto such a detector. The following references: U.S. Pat. No. 8,705,172, DE 102010049627 A1, US 2011/0267688 and the publications by C. Mueller et al., Phys. Rev. Lett., 104, 198101, 2010; A. York et al., "Resolution doubling in live, multi-cellular organisms via multifocal Structured Illumination Microscopy," Nature Methods, Vol. 9, 2012; G. De Luca et al., "Re-scan confocal microscopy: scanning twice for better resolution," Biomedical Optics Express, 4 (11), pp. 2644-2656; S. Roth, "Optical photon reassignment microscopy (OPRA)," arXiv: 1306.6230; A. York et al., Nat. Methods 9, 749, 2012, I. Gregor et al., Proc. SPIE 10071, "Single Molecule Spectroscopy and Superresolution Imaging X," 100710C, 24 Apr. 2017, doi: 10.1117/12.2255891; A. Jesacher et al., "Three-dimensional information from two-dimensional scans: a scanning microscope with postacquisition refocusing capability," Optica 2, pp. 210-213, 2015; also address this approach. The latter publication uses a phase mask for z-coding depth information.

In Airyscan microscopy, a 3D image recording is known in which so-called image stacks are recorded, i.e. multiple 2D images are captured in different focal planes. These image stacks can then be used in a 3D deconvolution to generate a depth-resolved image. An image stack can be dispensed with if, due to a targeted modification of the point spread function, an ambiguity which is present otherwise, namely that it is not known a priori whether a defocused point is situated above or below the focal plane, is removed. With z-modulated point spread functions, this ambiguity is removed, and in a 3D reconstruction reconstructing a three-dimensional image from a single 2D image is possible.

Generally, three-dimensional images remedy to a certain extent the problem, described in the introductory part, that the confocal stop sizes and optical section thickness are coupled. Therefore a three-dimensional image is generated first, and then the desired section plane is selected from the three-dimensional image. A disadvantage here is that a three-dimensional image stack must be worked through or a manipulated point spread function must be used. It is, therefore, an object of the invention to improve optical section thickness in 2D Airyscan microscopy without any of these two requirements.

SUMMARY OF THE INVENTION

The invention provides a method for high-resolution scan microscopy of a sample in accordance with the Airyscan principle. The sample is illuminated with illumination radiation. In this step, the illumination radiation is focused to form a diffraction-limited illumination spot at a point in or on the sample. This point is imaged in diffraction-limited manner into a diffraction image on a surface detector. The surface detector has pixels and consequently a spatial resolution that resolves a diffraction structure of the diffraction image. The point is displaced relative to the sample into different scanning positions. An increment between successive scanning positions is less than the diameter of the illumination spot, wherein each point of the sample is contained several times in differently located illumination spots and diffraction images. The surface detector is read. An image of the sample is produced from the data obtained and from the scanning positions assigned to said data. The image has a resolution in accordance with the Airyscan principle that is increased beyond a resolution limit of the imaging. The diffraction limit is consequently overcome. A pure 2D scan is performed.

To improve the depth resolution, the 2D image is produced not directly from the data of the surface detector, because then the conventional interdependency between the size of the diffraction image (which corresponds to the diameter of the confocal stop) and the optical section thickness would arise again. Instead, a three-dimensional reconstruction is first performed from the data of the surface detector with respect to the multiple scanning positions. Due to the pure 2D scan, the data originate from the fixed z-location of the focal plane. The three-dimensional reconstruction is known, but has hitherto been used only in point spread functions which were made asymmetrical to a specific extent in a targeted fashion by a manipulation element in the imaging and/or illumination beam path in order to avoid the mentioned ambiguities. Such an element is not used. For this reason, the 3D reconstruction provides only a provisional, depth-resolved 3D image, because a single focal plane position was used without manipulation. The problem of ambiguities exists because both, the illumination point spread function and the imaging point spread function, have not been manipulated in a targeted fashion and are consequently substantially symmetric with respect to the optical axis (unavoidable residual asymmetries can still occur due to imperfect components—what matters is that no targeted PSF manipulation is done). This ambiguity is deliberately accepted. Subsequently, a reduced section thickness is specified or it has already been predetermined. It is lower than the section thickness which results from the optical imaging. From the provisional, depth-resolved 3D image, only the portions which are situated within the reduced section thickness around the fixed z-location of the focal plane are selected. Portions which are situated outside the reduced section thickness are discarded. These are the portions which are subject to the aforementioned ambiguity problem.

Since the point spread function is not modified, it is substantially symmetric. This symmetry is generally a symmetry with respect to the focal plane. In general, the point spread function is also symmetric with respect to the optical axis, in particular it is rotationally symmetric. In most microscopes, the point spread function corresponds to an hourglass shape, with the waist being situated in the focal plane. Any remaining asymmetries occurring due to real implementation of the imaging elements do not lead to a modification being targeted such that the three-dimensional reconstruction from a single image would produce a depth-resolved image with uniqueness. Known reconstruction algorithms are used for 3D reconstruction from the image data that were obtained for a fixed location of the focal plane and with the unmodified point spread function. These algorithms have been developed for the production of a depth-resolved 3D image for microscopes with targeted manipulation of the point spread function. Thereby, a 3D image is produced that is depth-resolved, but due to the ambiguities, this image is no full and artifact-free 3D image. For this reason, it is referred to here as a provisional depth-resolved 3D image in order to differentiate it from depth-resolved artifact-free 3D images that the same reconstruction algorithms would provide in the case of targeted and extensive manipulation of the point spread function.

The beam path of the imaging and illumination is free of elements that manipulate the point spread function and introduce a targeted, determinable degree of asymmetry, which would be necessary and used for known depth-resolved approaches as explained for example in the publication by Jesacher et al. In particular, the beam path contains no astigmatic lenses or phase masks which modulate the point spread function asymmetrically and in dependence on depth in a targeted fashion.

In embodiments the three-dimensional reconstruction produces 3D images in multiple discrete section planes. For this reason a refinement is preferred which produces the provisional, depth-resolved 3D image such that it contains multiple discrete section planes. Then the section plane that corresponds to the fixed z-location of the focal plane is picked as a selected portion.

In embodiments, the illumination radiation excites emission of fluorescence radiation. This improves the signal-to-noise ratio and overall reinforces the algorithm. In particular the reduced section thickness can be very thin, then.

The microscope, provided analogously to the method, has an evaluation device which performs the method steps and is embodied to be suitable therefor. Analogously to the method, a corresponding microscope is provided, which comprises an illumination beam path for illuminating the sample with said characteristics and an imaging beam path for the diffraction-limited imaging of the point into a diffraction image on the surface detector having pixels. As already mentioned, the illumination beam path and the imaging beam path contain no manipulation element to make the point spread function asymmetric; in particular, no astigmatic lenses or phase masks are provided. Here, the term manipulation relates to a targeted influencing of the point spread function producing an asymmetry that prevents, in particular in the 3D reconstruction, ambiguity between layers that are situated below the focal plane and layers that are situated above the focal plane. Consequently, manipulation means that layers below the focal plane have a clear different point spread function than layers which are situated above the focal plane. Such manipulation typically requires the use of phase masks and/or astigmatic elements in the beam path.

Where the text below explains aspects of the method for microscopy, said aspects equally relate to the evaluation device which is adapted for performing the corresponding method steps. The device may be a computer which is implemented with corresponding software or with corresponding program code. Conversely, aspects described on the basis of the microscope and its operation equally relate to the method for microscopy.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention will be explained in more detail below on the basis of exemplary embodiments, with reference being made to the attached drawings, which likewise disclose features essential to the invention. These exemplary embodiments serve merely for illustration and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and developments which are described for one of the exemplary embodiments may also be applicable to other exemplary embodiments. In order to avoid repetition, the same elements or corresponding elements in the various figures are denoted by the same reference signs and are not explained a number of times. In the figures.

DETAILED DESCRIPTION OF EMBODIMENTS OF THE INVENTION

Figure 1:
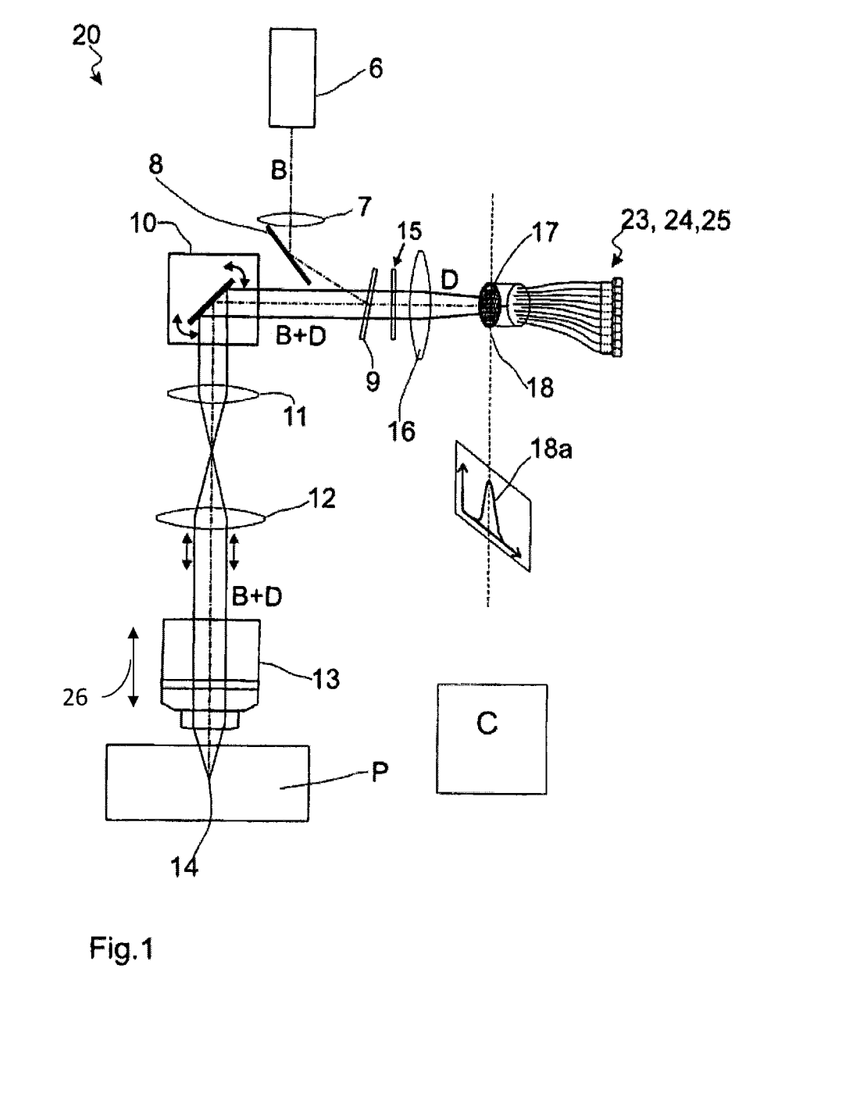
FIG. 1 is a schematic illustration of a microscope for high-resolution microscopy.

FIG. 1 schematically shows a confocal microscope 20 providing a high resolution, i.e. a resolution which is increased beyond the diffraction limit, in accordance with the principle of so-called Airyscans, as is known e.g. from EP 2317362 A1. It has a light source 6 for illuminating the sample P with an illumination spot 14. The illumination light B is guided via beam shaping means 7, a mirror 8 to a beam splitter 9. The beam splitter 9 is embodied such that it reflects as much as possible of the illumination light B and guides it to a scanner 10. The illumination light B is guided, from the scanner 10, by further beam shaping optical units 11 and 12 to an objective 13. The objective 13 focuses the illumination light B onto the sample P into an illumination spot 14.

The sample light D produced by the sample at the illumination spot B is collected by the objective 13 and guided, on the reverse path with respect to the illumination light B, to the beam splitter 9. The beam splitter 9 is embodied such that it transmits as great a portion as possible of the sample light D. The sample light D transmitted by the beam splitter 9 is passed to the detector 17 via a further filter 15 and a further beam shaping optical unit 16. The detector 17 detects the sample light D, produces electrical signals therefrom and passes them on, via conductors 23, 24, 25, to a control and evaluation device C, e.g. a computer. In this way, a diffraction image 18 is recorded, which is diffraction-limited, as diffraction structure 18a demonstrates.

In order to obtain an image of the sample P, the illumination spot 14 is moved by the scanner 10 in step-wise fashion over the sample P. From the step-wise sample signals thus obtained, the control and evaluation device C composes a 3D image which can be presented e.g. using a monitor.

The scanner 10 here permits the recording of a two-dimensional image which extends laterally, i.e. in a plane perpendicular to the optical axis of the objective.

As already mentioned, the illumination beam path and the imaging beam path contain no manipulation element to make the point spread function asymmetric in a targeted fashion; in particular, no astigmatic lenses or phase masks are provided. Here, the term manipulation relates to a targeted influencing of the point spread function producing an asymmetry that prevents, in particular in the 3D reconstruction, ambiguity between layers that are situated below the focal plane and layers that are situated above the focal plane. Consequently, targeted manipulation means that layers below the focal plane have a clear different point spread function than layers which are situated above the focal plane. Such manipulation typically requires the use of phase masks and/or astigmatic elements in the beam path.

Figure 2A:
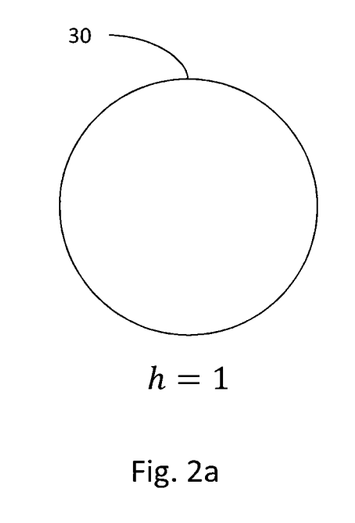
FIGS. 2a and 2b are schematic illustrations of the arrangements of pixels of a detector of the microscope of FIG. 1.
Figure 2B:
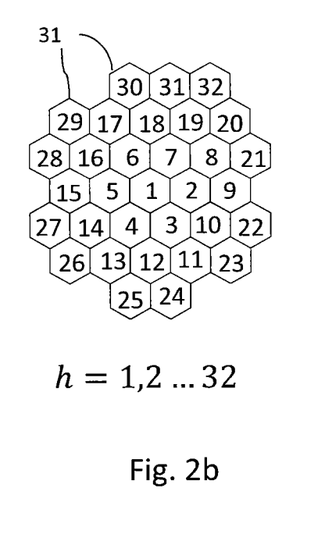

FIGS. 2a and 2b schematically illustrate detectors of a confocal microscope. FIG. 2a shows a conventional detector having a single sensitive surface 30. To achieve the high resolution, the detector 17 of the confocal microscope 20 has a plurality of detection elements or pixels 31, as in FIG. 2b. The elements are numbered, the arrangement in the example has 32 pixels.

The size of the pixels 31 is designed such that they are significantly smaller than the diffraction image 18 that is produced on the detector 17. At the same time, the number of the pixels 31, and consequently the entire surface of the detector 17, is designed such that a significant portion of the sample light D of the diffraction image 18 can be detected.

For comparison, FIG. 2a indicates a detector having only one element 30, as it would be used in a confocal microscope of typical resolution. The term typical resolution is to be understood here to mean that the resolution achieved at least corresponds to the Abbe limit. By contrast, in the confocal microscope 20 having increased resolution, the illumination and the detection act together such that theoretically twice as high a resolution can be achieved. In practice, the resolution increase is somewhat lower, because structures near the diffraction limit can be transmitted only with very poor contrast. Resolutions of up to 1.7 times the Abbe limit can be achieved realistically.

For each scanned point P ($\vec{r}$,z) the detector 17 of the high-resolution confocal microscope 20 captures many detected signals $D_h(\vec{r},z)$ corresponding to the number of the detector elements 31. $\vec{r}$ denotes the lateral sample position, z denotes the axial sample position, index h denotes the detector element (pixel). In the following, the description is based on 32 pixels; however, a different number of pixels can be used.

Each of the detector elements 31 captures a raw image signal from the sample P resulting in signals $D_h(\vec{r},z)$. The raw image signals differ from one another, wherein the differences are due to the individual lateral distance of the illumination light spot relative to the sample region detected by the respective detector element. The raw image signals are described mathematically by a convolution of the "real" sample image $O(\vec{r},z)$ with the point spread function (PSF) $I_h(\vec{r},z)$ of the respective detector element h:

$$D_h(\vec{r},z)=I_h(\vec{r},z)*O(\vec{r},z)$$

It is the function of the evaluation unit C to reconstruct from all $D_h(\vec{r},z)$ an image $\tilde{O}(\vec{r},z)$ that as accurately as possible corresponds to the original of the sample $O(\vec{r},z)$. A deconvolution (DCV) and a subsequent combining of the thus deconvolved raw image signals are used to this end, wherein the processes deconvolution and combining can merge into one another in process-technological fashion.

Figure 3:
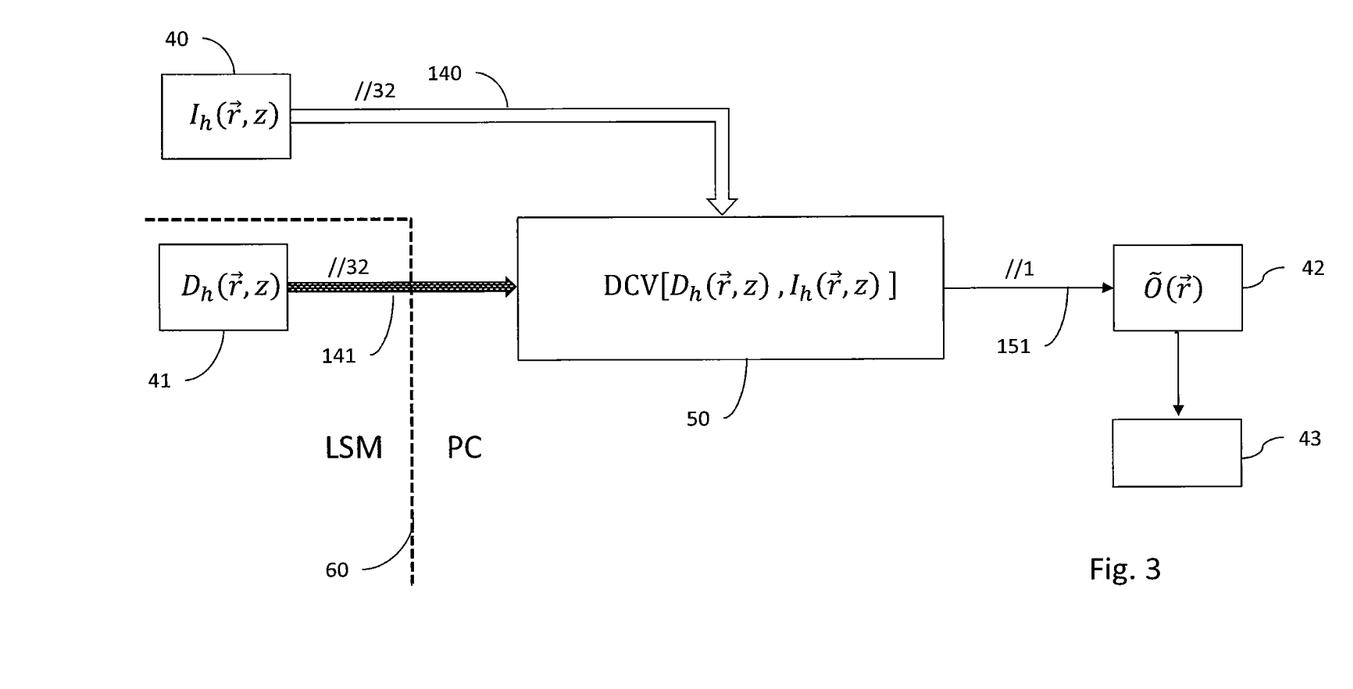
FIG. 3 is a signal propagation chart with respect to the microscopy method.

FIG. 3 illustrates all steps in a signal propagation chart. Starting point are the PSFs $I_h(\vec{r},z)$ 40 and the raw image signals $D_h(\vec{r},z)$ 41. From the properties of the optical system, the PSFs are known. They can be calculated from system parameters or be measured once and stored. The signals are passed on via lines 140, 141 to the evaluation 50, which correspondingly deconvolves all raw image signals, joins them together, and outputs an image of the sample $\tilde{O}(\vec{r},z)$ 42 that as accurately as possible corresponds to the original of the sample $O(\vec{r},z)$.

FIG. 3 and all other signal propagation charts show the quantity of the data to be transmitted by way of the thickness of the arrows 140, 141, 151. There are 32 raw image signals $D_h(\vec{r},z)$, and 32 PSFs $I_h(\vec{r},z)$. Produced during the evaluation is an image of the sample $\tilde{O}(\vec{r},z)$, the amount of data of this image is 32 times lower than that of all raw image signals. This is symbolized by the thin arrow 151. Likewise indicated at the arrows is the factor of the amounts of data with respect to a single image. That is to say //32 for the raw image signals and PSFs, //1 for the image of the sample.

The dashed line 60 separates domains of the entire confocal microscope 20 between which regions the data of the raw image signals must be transmitted. The domain LSM (laser scanning microscope) here comprises hardware-dependent domains of the confocal microscope, that is to say optics, mechanics and electronics, which permits data transmission to the domain PC. The region PC describes the control and evaluation device C and consequently everything which is required for controlling the confocal microscope 20, the further processing and representation of the data. The core of this domain is typically a personal computer C. In concrete terms, the data of all raw image signals must be transmitted from the LSM to the PC. Required herefor is a powerful interface, or in other words, the speed of the data transmission can be limited by a specified interface.

Figure 4:
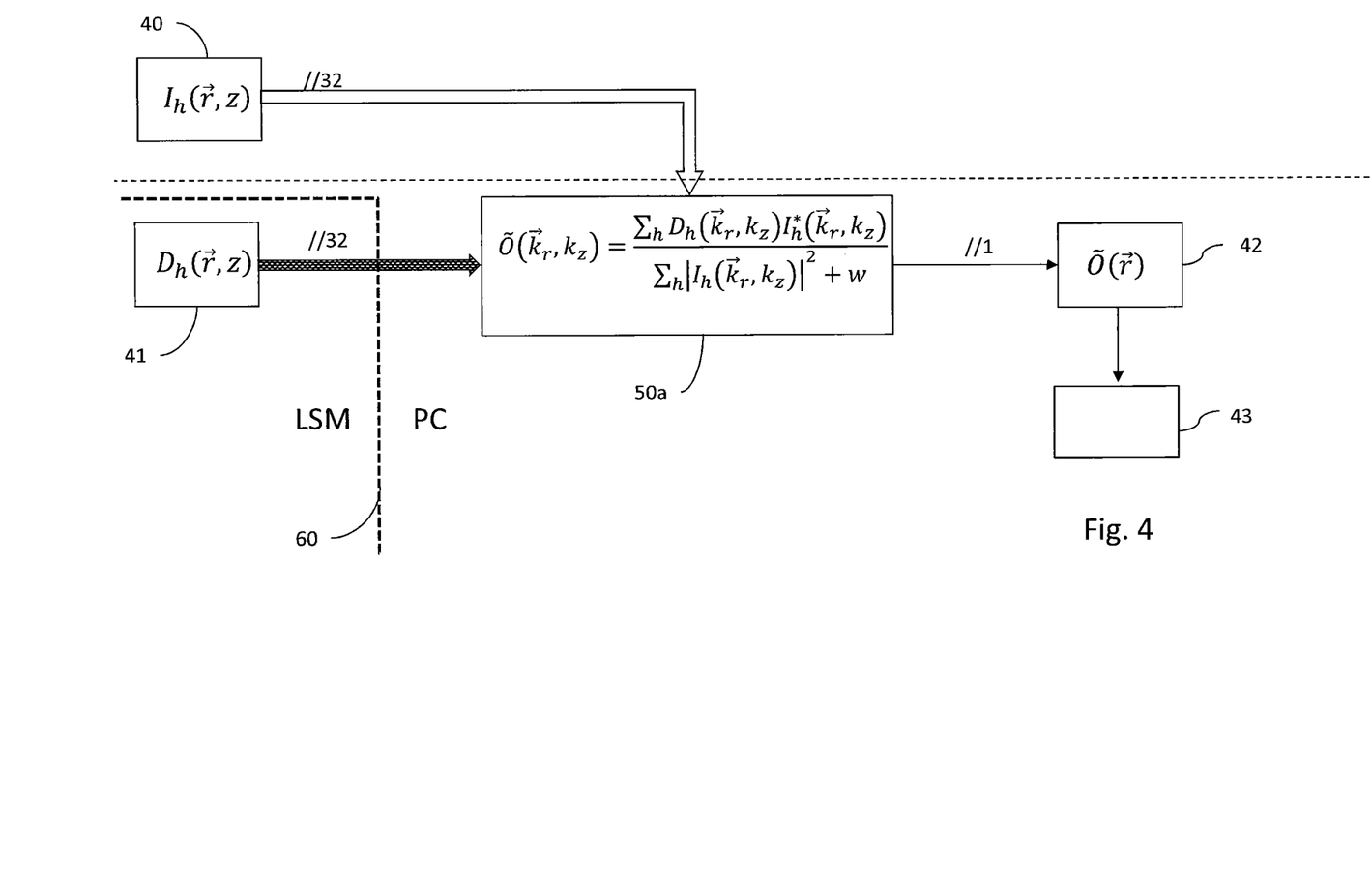
FIG. 4 illustrates an exemplary embodiment for the data processing of a high-resolution confocal microscope.

FIG. 4 shows an embodiment of the data processing of a high resolution confocal microscope 20. The evaluation unit 50a here performs e.g. what is known as Wiener filtering. In this filtering the raw image signals z) which are represented in spatial coordinates are subjected to a Fourier transform first, such that the raw image signals are now available in spatial frequency coordinates $D_h(\vec{k}_r,k_z)$. The same is done with the PSFs. The PSFs $I_h(\vec{k}_r,k_z)$ which were transformed into the Fourier domain are referred to as object transfer function OTF.

Two aspects are important to understand the deconvolution formula in 50a:
1. The raw image signals correspond to the sample convolved with the system PSF; as already illustrated above.
2. A convolution in the spatial domain corresponds to a multiplication in the Fourier domain. That is to say, the raw image signals can be represented in the Fourier domain as a product of sample and OTF:

$$D_h(\vec{k}_r,k_z)=I_h(\vec{k}_r,k_z)\cdot O(\vec{k}_r,k_z)$$

If the formula for $D_h(\vec{k}_r,k_z)$ is inserted into the deconvolution formula, the result is:

$$\tilde{O}(\vec{k}_r,k_z)=\frac{\Sigma_h I_h(\vec{k}_r,k_z)\cdot O(\vec{k}_r,k_z)\cdot I_h^*(\vec{k}_r,k_z)}{\Sigma_h |I_h(\vec{k}_r,k_z)|^2+w}=O(\vec{k}_r,k_z)\cdot\frac{\Sigma_h|I_h(\vec{k}_r,k_z)|^2}{\Sigma_h|I_h(\vec{k}_r,k_z)|^2+w}$$

$I_h^*(\vec{k}_r,k_z)$ designates the OTF with conjugate-complex phase, the product with the (original) OTF then produces the absolute square value.

w is a real positive number and is designated here as Wiener parameter. If the Wiener parameter is small with respect to $\Sigma_h|I_h(\vec{k}_r,k_z)|^2$, the fraction becomes nearly 1 and $\tilde{O}(\vec{k}_r,k_z)$ nearly corresponds to the original of the sample $O(\vec{k}_r,k_z)$. On the other hand, a w which is not too low ensures that the fraction at locations $(\vec{k}_r,k_z)$, where $\Sigma_h|I_h(\vec{k}_r,k_z)|^2$ is small, does not diverge. Such divergences would increase the noise which is inevitably present and not illustrated here in the raw image signals $D_h(\vec{k}_r,k_z)$ beyond all measure and render the resulting image $\tilde{O}(\vec{k}_r,k_z)$ unusable.

In order to be able to represent the image, the image $\tilde{O}(\vec{k}_r,k_z)$ which is available in spatial frequency coordinates must be transformed back into the spatial domain by a inverse Fourier transform.

The detected signal, $D(\vec{r},\vec{p})$, can be modeled as the product of the excitation PSF, $E(\vec{r})$, and of the object, $O(\vec{r})$, convolved with the detection PSF, $H(\vec{r})$:

$$D(\vec{r},\vec{p})=\int_{\vec{r}'} O(\vec{p}-\vec{r}')E(\vec{r}')H(\vec{r}'+\vec{r})d\vec{r}' \quad (1)$$

wherein $\vec{p}=(p_x,p_y,p_z)$ is the position of the excitation PSF and $\vec{r}=(x,y,z)$ is the position of the detection PSF (camera pixel or fiber element).

Obtained from in the 2D case ($p_z=0$, $z=0$) is the three-dimensional equation:

$$D(x,y,p_x,p_y)=\int_x\int_y\int_z O(p_x-x',p_y-y',z')E(x',y',z')H(x+x',y+y',z')dx'dy'dz' \quad (2)$$

The Fourier transform of (2) in $p_x$ and $p_y$ produces $$D(x, y, \omega_{p_x}, \omega_{p_y}) = \qquad (3)$$

$$\int_z O(\omega_{p_x}, \omega_{p_y}, z')FT_{x',y'}\{E(x', y', z')H(x + x', y + y', z')\}dz'$$

Substitution of $FT_{x',y'}\{E(x',y',z')H(x+x',y+y',z')\}$ by $EH(x, y, \omega_{p_x}, \omega_{p_y}, z')$ in (3) gives $$D(x, y, \omega_{p_x}, \omega_{p_y}) = \int_z O(\omega_{p_x}, \omega_{p_y}, z')EH(x, y, \omega_{p_x}, \omega_{p_y}, z')dz' \qquad (4)$$

For the purposes of simplifying the notation, it is assumed that x and y correspond to the position of the pixel i:

$$D_i(\omega_{p_x}, \omega_{p_y}) = \int_z O(\omega_{p_x}, \omega_{p_y}, z')EH_i(\omega_{p_x}, \omega_{p_y}, z')dz' \qquad (5)$$

Discretizing the integral over z in (5) results in $$D_i(\omega_{p_x}, \omega_{p_y}) = \sum_{k=1}^{n} O(\omega_{p_x}, \omega_{p_y}, z'_k)EH_i(\omega_{p_x}, \omega_{p_y}, z'_k) \qquad (6)$$

Equation (6) transforms the z-dimension in the object space into the x-y-dimension in the measured data. The transform is entirely defined by the "confocal" OTF, $EH_i(\omega_{p_x}, \omega_{p_y}, z_k')$. The z-dimensional in the object space can be reconstructed for example by linear regression in the Fourier domain.

Due to the unmanipulated, in particular symmetric point spread function a unique solution is available after this three-dimensional reconstruction only for the focal plane. Thus, this plane can be chosen without a problem. Extrafocal planes are discarded, i.e. planes which are outside the predetermined section thickness and in particular above and below the focal plane. It would not be possible to assign them uniquely in any case. However, this is not a problem, because the present microscopy produces a 2D image. Selected for this reason after a linear regression analysis in the Fourier domain is the central image of the obtained z stack. This corresponds to the following equation:

$$O^{focal}(\omega_{p_x}, \omega_{p_y}) = O(\omega_{p_x}, \omega_{p_y}, z_k')|_{z_k'=0} \qquad (7)$$

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method for high-resolution 2D scanning microscopy of a sample, the method comprising the following steps:
    a sample illumination step of illuminating the sample with illumination radiation in such a way that the illumination radiation is focused in or on the sample to form a diffraction-limited illumination spot at a point, wherein illuminating the sample with illumination radiation is done with an illumination point spread function which is not manipulated for producing an asymmetry;
    a sample imaging step of imaging the point in diffraction-limited manner into a diffraction image on a spatially resolving surface detector, wherein
        the imaging comprises an optical resolution and a focal plane,
        the diffraction image comprises a diffraction structure,
        the surface detector has a spatial resolution that resolves the diffraction structure of the diffraction image,
        imaging the sample is done with an imaging point spread function which is not manipulated for producing an asymmetry, and
        the imaging defines a section thickness in the sample;
    a scanning step of displacing the point relative to the sample into a different scanning position;
    a detector reading step of reading detection data from the surface detector, and assigned to an actual scanning position;
    repeating the sample illumination step, the sample imaging step and the scanning step several times such that the sample is illuminated and imaged at a plurality of scanning positions while a z-location of the focal plane is fixed;
    a provisional 3D image generating step of generating a provisional depth-resolved 3D image by a three-dimensional deconvolution process using the data of the surface detector assigned to the plurality of scanning positions at the fixed z-location of the focal plane;
    a 2D image generation step of
        specifying a reduced section thickness or utilizing a predetermined reduced section thickness, which reduced section thickness is less than the section thickness defined by the imaging in the sample imaging step, and selecting in the provisional, depth-resolved 3D image, only sample portions which are situated in the reduced section thickness around the fixed z-location of the focal plane and discarding portions which are outside the reduced section thickness around the fixed z-location of the focal plane; and
    producing a 2D image of the selected sample portions from the provisional, depth-resolved 3D image, wherein the 2D image has a resolution that is increased beyond the optical resolution.

2. The method as claimed in claim 1, wherein the three-dimensional deconvolution of the provisional, depth-resolved 3D image is produced such that it contains a plurality of discrete section planes, and wherein, as a selected portion, the section plane which is assigned to, or closest to, the fixed z-location of the focal plane is used.

3. The method as claimed in claim 1, wherein the imaging point spread function and the illumination point spread function are symmetric with respect to an optical axis.

4. The method as claimed in claim 2, wherein the imaging point spread function and the illumination point spread function are symmetric with respect to an optical axis.

5. The method as claimed in claim 1, wherein the sample is excited by the illumination radiation to emit fluorescence radiation.

6. The method as claimed in claim 2, wherein the sample is excited by the illumination radiation to emit fluorescence radiation.

7. The method as claimed in claim 3, wherein the sample is excited by the illumination radiation to emit fluorescence radiation.

8. The method as claimed in claim 4, wherein the sample is excited by the illumination radiation to emit fluorescence radiation.

9. A microscope for high-resolution 2D scanning microscopy of a sample, comprising:
- an illumination beam path for illuminating the sample with illumination radiation, wherein the illumination radiation is focused in or on the sample to form a diffraction-limited illumination spot at a point, wherein the illumination beam path is free from elements for manipulating an illumination point spread function;
- an imaging beam path for diffraction-limited imaging of the point into a diffraction image on a spatially resolving surface detector providing detection data,
- wherein the imaging beam path is free from elements for manipulating an imaging point spread function and images the sample with an optical resolution and a section thickness and from a focal plane,
- wherein the diffraction image comprises a diffraction structure, and
- wherein the surface detector has a spatial resolution that resolves the diffraction structure of the diffraction image;
- a scanning device for displacing the point relative to the sample into different scanning positions with a scanning step increment of less than half the diameter of the illumination spot, wherein the scanning device scans the sample at a plurality of scanning positions while a z-location of a focal plane of the image is fixed;
- an evaluation device which is configured for reading out the detection data for the plurality of scanning positions and assigning the scanning positions to said detection data, wherein the evaluation device is further configured
  - to perform a three-dimensional deconvolution of the detection data and the assigned scanning positions and to produce a provisional depth-resolved 3D image,
  - to specify a reduced section thickness, or a reduced section thickness is predetermined for the evaluation device, which reduced section thickness is less than the section thickness,
  - to select only sample portions which are, in the provisional depth-resolved 3D image, situated in the reduced section thickness around the fixed z-location of the focal plane, and to discard portions which are outside the reduced section thickness around the fixed z-location of the focal plane, and
  - to produce only for the selected sample portions a 2D image of the sample, from the provisional depth-resolved 3D image, said 2D image having a resolution that is increased beyond a resolution limit of the imaging beam path, wherein the evaluation device is configured.

10. The microscope as claimed in claim 9, wherein the evaluation device produces the provisional, depth-resolved 3D image in the three-dimensional deconvolution such that it contains a plurality of discrete section planes, and uses, as a selected portion, the section plane which is assigned to, or closest to, the fixed z-location of the focal plane.

11. The microscope as claimed in claim 9, wherein the imaging point spread function and the illumination point spread function are symmetric with respect to an optical axis.

12. The microscope as claimed in claim 10, wherein the imaging point spread function and the illumination point spread function are symmetric with respect to an optical axis.

13. The microscope as claimed in claim 9, wherein the illumination radiation beam is configured to excite the sample to emit fluorescence radiation.

14. The microscope as claimed in claim 10, wherein the illumination radiation beam is configured to excite the sample to emit fluorescence radiation.

15. The microscope as claimed in claim 11, wherein the illumination radiation beam is configured to excite the sample to emit fluorescence radiation.

16. The microscope as claimed in claim 12, wherein the illumination radiation beam is configured to excite the sample to emit fluorescence radiation.

* * * * *

UNITED STATES PATENT AND TRADEMARK OFFICE
CERTIFICATE OF CORRECTION

PATENT NO. : 10,996,452 B2
APPLICATION NO. : 16/107506
DATED : May 4, 2021
INVENTOR(S) : Ingo Kleppe and Yauheni Novikau Page 1 of 2

It is certified that error appears in the above-identified patent and that said Letters Patent is hereby corrected as shown below:

On the Title Page

Item (72), Inventors:  Now reads: "Ingo Kleppe, Jena (DE); Yauheni Novikau, Jena (DE)"
Should read: -- Ingo Kleppe, Jena (DE); Yauheni Novikau, Apolda (DE) --

In the Specification

Column 7, Line 61: Now reads: "this filtering the raw image signals z) which are represented"
Should read: -- this filtering the raw image signals $D_h(\vec{r}, z)$ which are represented --

Column 8, Line 45: Now reads: "The detected signal, $D(\vec{r}, \vec{p})$, can be modeled as the"
Should read: -- The detected signal $D(\vec{r}, \vec{p})$, can be modeled as the --

Column 8, Line 46: Now reads: "product of the excitation $PSF, E(\vec{r})$, and of the object"
Should read: -- product of the excitation $PSF\ E(\vec{r})$, and of the object --

Column 8, Line 47: Now reads: "$O(\vec{r})$, convolved with the detection $PSF, H(\vec{r})$;"
Should read: -- $O(\vec{r})$, convolved with the detection $PSF, H(\vec{r})$: --

Column 8, Line 50: Now reads: "$D(\vec{r},\vec{p}) = \int_{\vec{r}} o(\vec{p}-\vec{r}')E(\vec{r}')H(\vec{r}'+\vec{r})d\vec{r}$ (1)"

Should read: -- $D(\vec{r},\vec{p}) = \int_{\vec{r}} O(\vec{p}-\vec{r}')E(\vec{r}')H(\vec{r}'+\vec{r})d\vec{r}$ (1) --

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,996,452 B2

Column 8, Line 54: Now reads: "wherein $\vec{p}=(p_x,p_y,p_z)$ is the position of the excitation PSF"

Should read: -- wherein $\vec{p}=(p_x,p_y,p_z)$ is the position of the excitation PSF --

Column 8, Line 56: Now reads: "$\vec{r}=(x,y,z)$ is the position of the detection PSF (camera"

Should read: -- $\vec{r}=(x,y,z)$ is the position of the detection PSF (camera --

Column 9, Line 38: Now reads: "$\omega_{p_x}, \omega_{p_y}, z'_k)$. The z-dimensional in the object space can be"

Should read: -- $\omega_{p_x}, \omega_{p_y}, z'_k)$. The z-dimensional in the object space can be --